Dec. 19, 1950      G. E. FRANCK      2,534,509
VALVE
Filed July 13, 1945
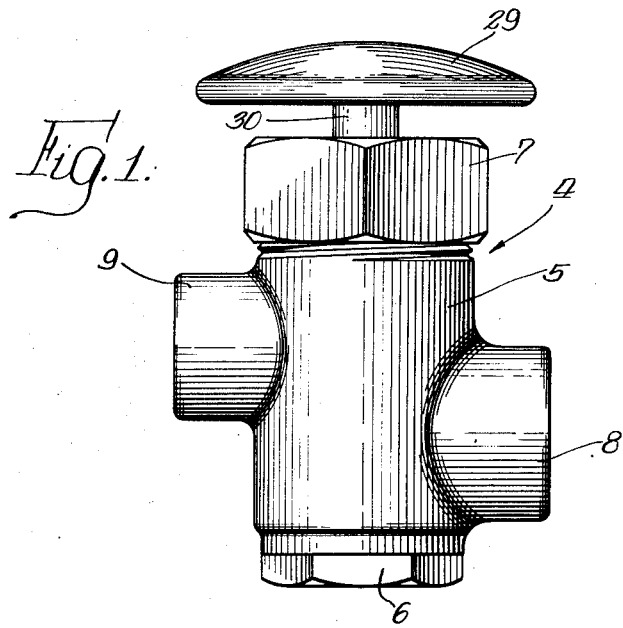
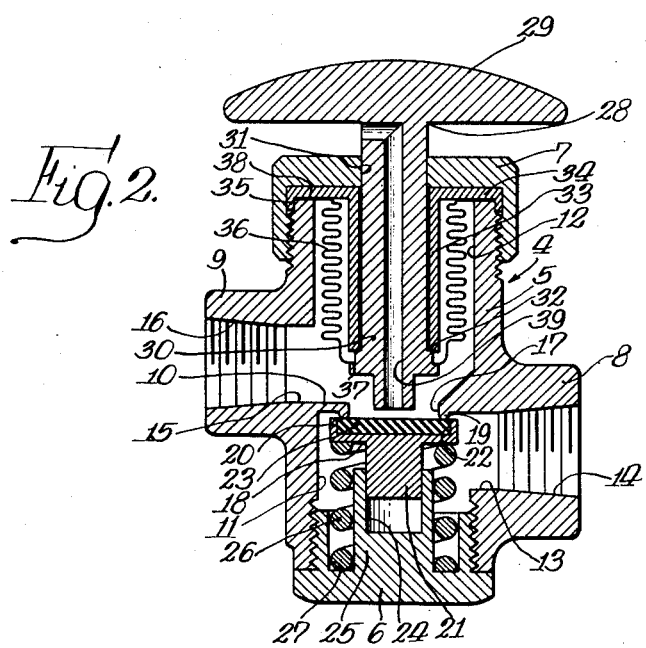
INVENTOR.
George E. Franck,
BY Patented Dec. 19, 1950

2,534,509

UNITED STATES PATENT OFFICE 2,534,509

VALVE

George E. Franck, Riverside, Ill., assignor to The Imperial Brass Manufacturing Company, Chicago, Ill., a corporation of Illinois Application July 13, 1945, Serial No. 604,899

1 Claim. (Cl. 251—137)

1

The invention relates generally to valves and more particularly to a feed valve.

One object of the invention is to provide a new and improved feed valve having a bleed opening for exhausting fluid from the discharge side of the valve, the bleed opening being automatically closed as an incident to opening of the valve.

Another object is to provide a feed valve having a normally seated valve element and an actuating means for the valve element having a bleed passage therein, the actuating means in actuated position opening the valve element and closing the bleed passage and, in normal position, permitting the valve element to close and the bleed passage to open to the discharge side of the valve.

Still another object is to provide a feed valve having a fluid exhausting means wherein a single valve element controls the main fluid supply passage and also the exhausting means.

Other objects and advantages will become apparent from the following detailed description taken in connection with the accompanying drawings, in which:

Fig. 1 is a side elevational view of a valve embodying the feature of this invention.

Fig. 2 is a diametrical sectional view of the valve of Fig. 1.

While the invention is susceptible of various modifications and alternative constructions, it is shown herein and will hereinafter be described in a preferred embodiment. It is not intended, however, that the invention is to be limited thereby to the specific construction disclosed. On the contrary, it is intended to cover all modifications and alternative constructions falling within the spirit and scope of the invention as defined in the appended claims.

In the exemplary embodiment of the invention shown in the drawing, the valve comprises a casing, generally designated 4, composed of a main casing member 5 and two cap nuts 6 and 7. The main casing member 5 is generally cylindrical save for a radially projecting boss 8 and a radially projecting boss 9, herein extending in diametrically opposed directions and somewhat offset from one another axially of the main body member. The main body member 5 is bored axially but is divided intermediate its ends by a radially inwardly projecting flange 10 to form a chamber 11 and a chamber 12 at opposite ends. Communicating with the chamber 11 is a radial passage 13 opening through the boss 8 and terminating in a threaded port 14 for the reception of a conduit leading to a source of fluid under pressure making of the port 14 and the passage

2

13 the inlet to the valve. Communicating with the chamber 12 is a radial passage 15 opening through the boss 9 and terminating in a threaded port 16 for the reception of a conduit leading to a device which is to be supplied with fluid under pressure.

Flow of fluid from the inlet 14 to the outlet 16 through an opening 17 defined by the annular flange 10 is controlled by means of a valve element 18. To that end, the flange 10 has formed thereon an annular bead 19 forming a valve seat extending into the chamber 11 and with which the valve element 18 cooperates. The valve element 18 has a head 20 and a stem 21. The head of the valve element is of a diameter larger than the bead 19 and is formed with an axially opening recess 22 for the reception of a disk 23 of some suitable resilient material, such as rubber or one of the plastics. The valve element 18 is mounted for axial movement toward or away from the valve seat formed by the bead 19 and to that end the stem 21 is slidably received in and guided by a bore 24 formed in and opening inwardly of an axially extending boss 25 constituting a part of the cap nut 6. A compression spring 26 bearing at one end against the head 20 of the valve and at the other end against the cap nut 6 functions to retain the valve element normally in seated or closed position. At the outer end of the chamber 11, the member 5 is threaded internally for cooperation with external threads formed on the cap nut 6. Formed in the cap nut is an annular groove 27 in which one end of the compression spring is received and which serves to define the boss 25.

The normally seated valve element 18 is adapted to be unseated by means of an actuator 28 comprising a head 29 and a stem 30 which projects slidably through a hole 31 in the cap nut 7 and thence into the chamber 12. Near its inner end, the stem 30 of the actuator is formed with a first annular shoulder 32 which is adapted to abut the inner end of a guide sleeve 33 for the purpose of limiting outward movement of the actuator when the valve is assembled. At its outer end, the sleeve 33 is formed with a radially extending flange 34 adapted to be clamped between the end of the main casing member 5 and the cap nut 7. Herein the cap nut 7 is internally threaded and the end of the main casing member 5 is externally threaded so as to permit such clamping of the flange 34 between these parts. The flange 34 may in turn be formed at its periphery with an axially inwardly extending flange 35 snugly engaging the end of the main casing member 5 so as to center the sleeve 33 and hence the stem 30 properly within the chamber 12. For this purpose, the end of the main body member 5 is preferably turned down with the external threads formed thereon commencing back from the very end of the body member a distance equal to the length of the flange 35.

Sealing the valve against leakage along the stem 30 of the actuator is a resilient metal bellows 36 which herein also serves as the spring means for urging the actuator 28 to normal, non-actuated position. To that end, the bellows 36 surrounds the sleeve 33 and at its inner end is secured in fluid-tight relationship in any conventional manner such as by soldering, brazing, or welding, to a second annular shoulder 37 formed on the stem 30 a short distance spaced axially inwardly of the shoulder 32. At the other end, the bellows 36 has a radially outwardly extending flange 38 which is received and clamped in fluid-tight relationship between the end of the main body member 5 and the flange 34 of the sleeve 33.

Means is provided herein for exhausting fluid from the outlet or discharge side of the valve whenever the supply of fluid is cut off by closure of the valve element 18. Such means herein is of such character that it will be automatically closed whenever the valve element 18 is open and will be open whenever the valve element 18 is closed. Moreover, the valve element 18 herein is arranged to control both the supply of fluid and the exhausting means. To that end, the stem 30 has a bleed or exhaust passage 39 formed therein, and opening at one end radially through the stem just beneath the head 29 so as to be disposed outwardly of the valve casing whenever the actuator is in normal position. The other end of the passage 39 opens axially through the inner end of the stem 30 which stem, in the normal position of the actuator, terminates a short distance axially above the valve element 18 so that the passage 39 is in open communication with the chamber 12. It will readily be seen that, as the actuator is moved axially downwardly to unseat the valve element 18, the valve element will close the passage 39 before it is unseated from the seat formed by the bead 19. Conversely, when the actuator is released, the spring 26 will return the valve element 18 to seated position simultaneously with or before the bellows 36 unseats the stem 30 from the valve element 20.

It is believed apparent from the foregoing that I have perfected a self-exhausting feed valve which assures proper operation, particularly sequence of main valve and exhaust passage opening or closing operations, while at the same time providing a valve having a minimum number of parts and hence economically manufactured and relatively free from trouble. Of particular significance is the fact that the closing of the exhaust passage prior to the opening of the main valve is a positive action, independent of resilient members. The valve is readily disassembled and reassembled for repair or inspection, is leak-proof, and is otherwise of sound commercial design.

I claim as my invention:

A self-exhausting valve comprising an elongated casing having a bore extending longitudinally thereof, a radially inwardly extending annular flange dividing the bore into a pair of chambers and having a bead forming an annular valve seat, an inlet port and an outlet port in said valve casing communicating one with each of the chambers, a valve element disposed in the chamber communicating with the inlet port cooperating with said annular valve seat to control the flow of fluid from the inlet to the outlet port, a closure for the end of the bore to complete the inlet chamber having means guiding said valve element for limited sliding movement axially of the bore, a compression spring interposed between said valve element and said closure urging said valve element to seated position, a closure for the other end of the bore, a guide member disposed in the chamber communicating with said outlet port and secured by said last named closure member comprising a sleeve concentric of and of a diameter smaller than said bore to form an annular space with the bore and a radially extending flange for clamping between the last named closure and the end of said casing, an actuator for said valve element having a stem extending slidably through said last named closure member and said guide member and in the normal position of said actuator terminating slightly short of said valve element, an exhaust passage formed in said stem opening at its inner end through the end face of said stem and opening at its outer end outwardly of said valve casing, and means for preventing leakage of fluid along said stem comprising a cylindrical resilient bellows disposed in the annular space in surrounding relation to said stem and said sleeve-like member and having a fluid-tight connection with said stem near its inner end and a fluid-tight seal with the flange of said guide member at the outer end of said bellows, said bellows urging said actuator to normal position.

GEORGE E. FRANCK.

REFERENCES CITED

The following references are of record in the file of this patent:

UNITED STATES PATENTS

| Number | Name | Date |
|---|---|---|
| 1,121,929 | Lewis | Dec. 22, 1914 |
| 1,511,554 | Woodring | Oct. 14, 1924 |
| 1,992,212 | Horne | Feb. 26, 1935 |

FOREIGN PATENTS

| Number | Country | Date |
|---|---|---|
| 44,059 | Netherlands | of 1938 |